United States Patent
Takeshima et al.

(10) Patent No.: US 8,596,428 B2
(45) Date of Patent: Dec. 3, 2013

(54) EQUALIZER DEVICE FOR PARKING BRAKE

(75) Inventors: Toshiro Takeshima, Toyota (JP); Hideki Matsubo, Toyota (JP); Narito Tani, Toyota (JP); Mitsuo Yoshida, Toyota (JP)

(73) Assignee: Toyoda Iron Works Co., Ltd., Toyota (JP)

( * ) Notice: Subject to any disclaimer, the term of this patent is extended or adjusted under 35 U.S.C. 154(b) by 219 days.

(21) Appl. No.: 13/281,930

(22) Filed: Oct. 26, 2011

(65) Prior Publication Data

US 2012/0103736 A1 May 3, 2012

(30) Foreign Application Priority Data

Nov. 2, 2010 (JP) ................................. 2010-246761

(51) Int. Cl.
*F16D 65/14* (2006.01)

(52) U.S. Cl.
USPC ...................................... 188/204 R; 188/2 D

(58) Field of Classification Search
USPC ...... 188/204 R, 2 D, 265, 204 A; 74/501.5 R, 74/502.6, 502.4
See application file for complete search history.

(56) References Cited

U.S. PATENT DOCUMENTS

| 5,203,068 A | * | 4/1993 | Siring | 29/452 |
| 6,820,516 B2 | * | 11/2004 | Grundke | 74/501.5 R |
| 7,314,123 B2 | * | 1/2008 | Sakashita et al. | 188/204 R |
| 7,891,468 B2 | * | 2/2011 | Tsubouchi | 188/1.11 E |
| 8,096,389 B2 | * | 1/2012 | Herman et al. | 188/2 D |
| 8,104,373 B2 | * | 1/2012 | Hayashi et al. | 74/502.6 |

FOREIGN PATENT DOCUMENTS

JP  A-2006-207762  8/2006

\* cited by examiner

*Primary Examiner* — Bradley King
(74) *Attorney, Agent, or Firm* — Oliff & Berridge, PLC

(57) ABSTRACT

An equalizer device for a parking brake including an equalizer body that is formed by connecting paired side plates, which extend parallel to each other from a back plate so as to form a U-shape and a synthetic resin member that is fixedly arranged inside the equalizer body. The equalizer body includes paired engagement holes, paired insertion holes, and paired slits. Portions of the back plate, at which the engagement holes are formed, serve as the engagement portions. The synthetic resin member has a substantially flat plate shape that is arranged so as to face a portion of an inner face of a first side plate. The portion is a part of the U-shape, and extends parallel to the first side plate. The synthetic resin member includes paired gate portions and an engagement lug. The synthetic resin member is fitted to the equalizer body by the engagement lug.

4 Claims, 7 Drawing Sheets

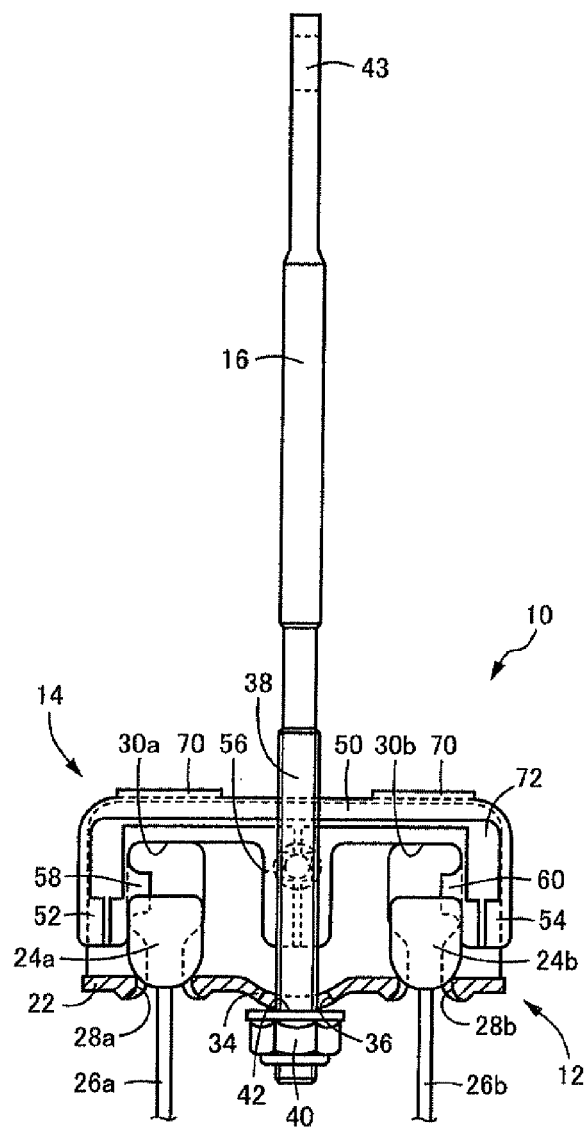
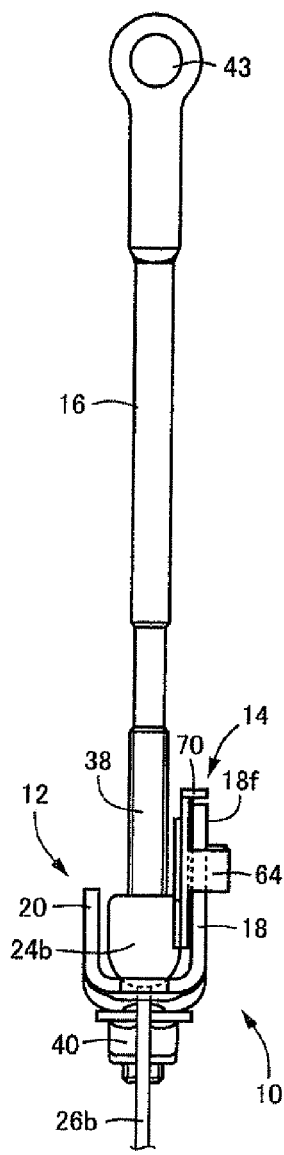
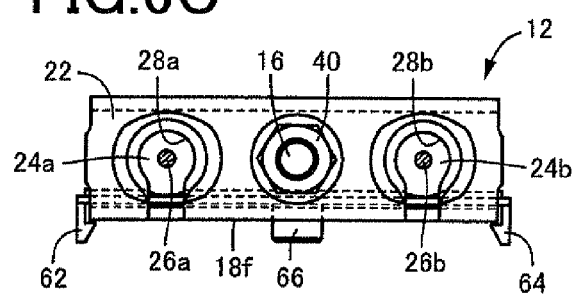

FIG.7A
FIG.7B
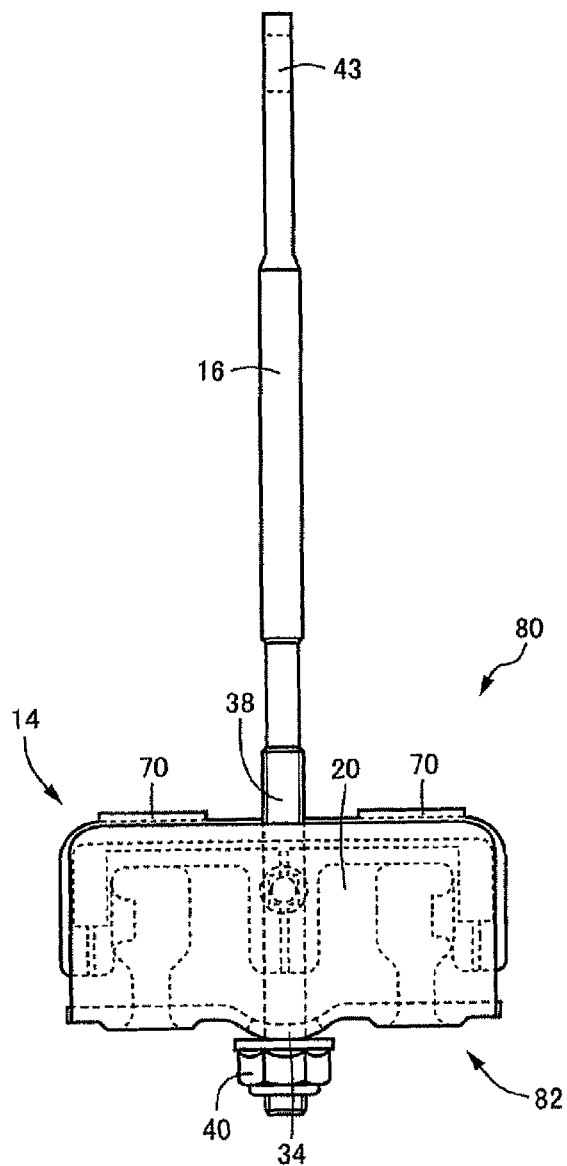
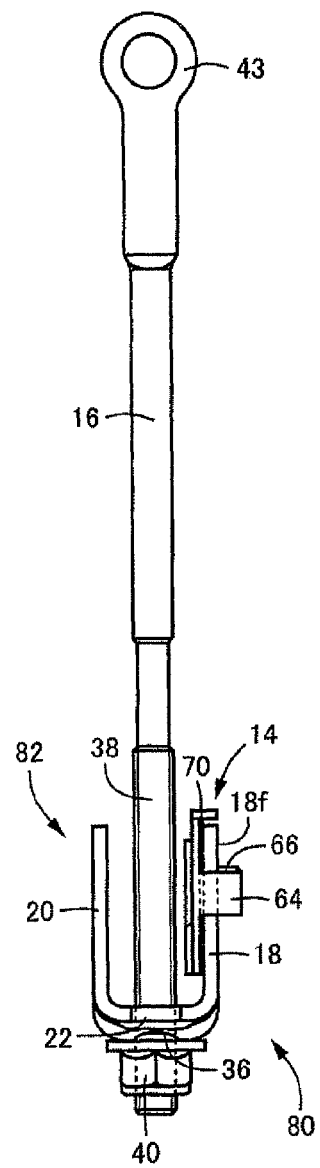

EQUALIZER DEVICE FOR PARKING BRAKE

INCORPORATION BY REFERENCE

The disclosure of Japanese Patent Application No. 2010-246761 filed on Nov. 2, 2010 including the specification, drawings and abstract is incorporated herein by reference in its entirety.

BACKGROUND OF THE INVENTION

1. Field of the Invention

The invention relates generally to an equalizer device for a parking brake, and more specifically to a technique for reducing the production cost of an equalizer device including a synthetic resin member that prevents output members from being detached from an equalizer body.

2. Description of Related Art

There is a known equalizer device for a parking brake, in which paired engagement portions, with which paired output members coupled to brake devices of right and left wheels are respectively engaged, are formed so as to be symmetric with respect to an input portion. When a pulling force for actuating the parking brake is applied to the input portion, the equalizer device actuates the brake devices by pulling the paired output members in a state where the equalizer device is oscillable using the input portion as the axis of oscillation. Japanese Patent Application Publication No. 2006-207762 describes an example of such an equalizer device. This equalizer device includes an equalizer body formed by connecting paired side plates, which extend parallel to each other from a back plate so as to form a U-shape, and a synthetic resin member that is fixedly arranged inside the equalizer body. Elastic deformation of gate portions of the synthetic resin member allows the output members to be inserted into the equalizer body. On the other hand, after the gate portions return to their original form, the output members are prevented from being detached from the equalizer body.

In such a conventional equalizer device, flanges are formed on the back plate of the equalizer body. When stopper lugs of the synthetic resin member are elastically engaged with the flanges, the synthetic resin member is fitted to the equalizer body. Therefore, a bending work or the like for forming the flanges on the equalizer body is required, which increases the production cost accordingly.

SUMMARY OF THE INVENTION

The invention is made in light of the above-described circumstances, and it is an object of the invention to reduce the production cost by refining a structure for fitting a synthetic resin member to an equalizer body without reducing the efficiency of fitting output members to the equalizer body.

MEANS FOR SOLVING THE PROBLEMS

To achieve the above object, the first aspect of the present invention provides an equalizer device for a parking brake, in which paired engagement portions, with which paired output members coupled to brake devices of right and left wheels are respectively engaged, are formed so as to be symmetric with respect to an input portion, and which actuates the brake devices by pulling the paired output members in a state where the equalizer device is oscillable using the input portion as an axis of oscillation when a pulling force for actuating the parking brake is applied to the input portion, comprising: (a) an equalizer body that is formed by connecting paired side plates, which extend parallel to each other from a back plate so as to form a U-shape; and a synthetic resin member that is fixedly arranged inside the equalizer body, wherein (b) the equalizer body has (b-1) paired engagement holes that are formed in the back plate, and that allow coupling members that couples the output members to the brake devices to extend outside the equalizer body and prevent the output members from passing through the engagement holes, (b-2) paired insertion holes which are formed in a first side plate, which is one of the paired side plates, so as to correspond to the paired engagement holes, and through which the paired output members are inserted to an inner side of the U-shape, and (b-3) paired slits which are formed so as to lie astride the first side plate and the back plate and so as to connect the insertion holes to the engagement holes, and into which the coupling members are inserted, (b-4) portions of the back plate, at which the engagement holes are formed, serve as the engagement portions, (e) (c-1) the synthetic resin member has a substantially flat plate shape that is arranged so as to face a portion of an inner face of the first side plate, the portion being a part of the U-shape, and so as to extend parallel to the first side plate, the synthetic resin member includes (c-2) paired gate portions that are formed so as to partially block the respective paired insertion holes, that are elastically deformed to allow insertion of the output members into the equalizer body, and that return to their original form to prevent the output members from coming out of the equalizer body through the insertion holes, and (c-3) an engagement lug that extends on an outer side of an outer edge of the first side plate and extends beyond an outer face of the first side plate, which is on an opposite side from the inner face, and is engaged with the outer face, and (c-4) the synthetic resin member is fitted to the equalizer body by the engagement lug.

The second aspect of the invention provides the equalizer device recited in the first aspect of the invention, wherein (a) a plurality of the engagement lugs is formed such that the engagement lugs are engaged with the outer face at both side edges of the first side plate in a width direction that is parallel to the back plate; and (b) a second side plate, which is the other of the paired side plates of the equalizer body and which is on an opposite side from the first side plate, is formed such that a length by which the second side plate projects from the back plate is shorter than a length by which the first side plate projects from the back plate, so that the equalizer body has a J-shape.

The third aspect of the invention provides the equalizer device recited in the first or second aspect of the invention, wherein a positioning projection and a rotation preventing projection are formed integrally with the synthetic resin member, the positioning projection is fitted in a positioning hole formed in the first side plate, and the rotation preventing projection is engaged with a distal edge of the first side plate, which is an edge that faces a direction in which the first side plate projects from the back plate.

THE EFFECTS OF THE INVENTION

In the above-described equalizer device for the parking brake, the output members are inserted into the equalizer body through the insertion holes by elastically deforming the gate portions of the synthetic resin member, and the coupling members that extend from the output members are inserted into the slits, and the output members are relatively moved toward the back plate to be seated at the engagement holes. In this case, after the output members are inserted into the equalizer body through the insertion holes, and the gate portions return to their original forms, to prevent the output members from coming out of the equalizer body through the insertion holes. Therefore, the state of engagement of the output members with the equalizer device is appropriately maintained just by inserting the output members into the equalizer body through the insertion holes by elastically deforming the gate portions to fit the output members to the equalizer device. Therefore, it is possible to easily perform a work for coupling the output members to the equalizer device.

The synthetic resin member having the gate portions has a substantially flat plate shape, and is arranged to face the inner face of the first side plate. Further, paired engagement lugs extend on the outer side of the side edges of the first side plate and extend beyond the outer face, and are engaged with the outer face. Thus, the synthetic resin member is fitted to the equalizer body. Therefore, a flange or the like with which the synthetic resin member is engaged is no longer required to be formed in the equalizer, which reduces the production cost. Although the engagement lugs need to be formed in the synthetic resin member, the engagement lugs are easily formed integrally with the synthetic resin member. Therefore, it is possible to reduce the production cost as a whole.

In the second aspect of the invention, a plurality of engagement lugs are arranged so as to be engaged with the outer face at respective side edges of the first side plate in the width direction thereof. The engagement lugs are fixed such that the first side plate is sandwiched therebetween in the longitudinal direction of the lower plate 18 (width direction). Accordingly, the dimensional deviation between these members is reliably absorbed. Therefore, it is possible to reliably fit the synthetic resin member to the equalizer body. The length by which the second side plate of the equalizer projects from the back plate is shorter than the length by which the first side plate projects from the back plate, and therefore the equalizer body has a J-shape. Because the length of the second side plate is shorter, the weight of the equalizer is reduced accordingly. In addition, when the synthetic resin member is fitted to the first side plate of the equalizer body, the work is performed more efficiently. As a result, the work cost is reduced.

In the third aspect of the invention, the positioning projection and the rotation preventing projections are formed integrally with the synthetic resin member. The positioning projection is fitted in the positioning hole formed in the first side plate, and the rotation preventing projections are engaged with the distal edge of the first side plate. Therefore, with a simple configuration, it is possible to reliably suppress rattle of the synthetic resin member with respect to the equalizer.

BRIEF DESCRIPTION OF THE DRAWINGS

FIG. 1A is a front view. FIG. 1B is a right side view of the equalizer device and the pull rod when they are viewed from a position on the right side of them in FIG. 1A. FIG. 1C is a bottom view of the equalizer device and the pull rod when they are viewed from a position under them in FIG. 1A. FIG. 1D is an enlarged view of a portion ID in FIG. 1C.

FIG. 2 is a front view corresponding to FIG. 1A.

FIG. 3 is a right side view corresponding to FIG. 1B.

FIG. 4A is a back view of the equalizer device when it is viewed from a position behind it in FIG. 1A. FIG. 4B is a side view of the equalizer device when it is viewed from a position on the right side of it in FIG. 4A.

FIG. 6A to FIG. 6C are views showing a state where the parking brake cables are coupled to the equalizer device in FIG. 1. FIG. 6A is a front view showing a state where a part of an equalizer body is cut out. FIG. 6B is a right side view of the equalizer device and the pull rod when they are viewed from a position on the right side of them in FIG. 6A. FIG. 6C is a bottom view of the equalizer device and the pull rod when they are viewed from a position under them in FIG. 6A.

FIG. 7A and FIG. 7B are views showing another embodiment according to the invention. FIG. 7A is a front view. FIG. 7B is a right side view of the equalizer device and the pull rod when they are viewed from a position on the right side of them in FIG. 7A.

DETAILED DESCRIPTION OF EMBODIMENTS

Figure 1A:
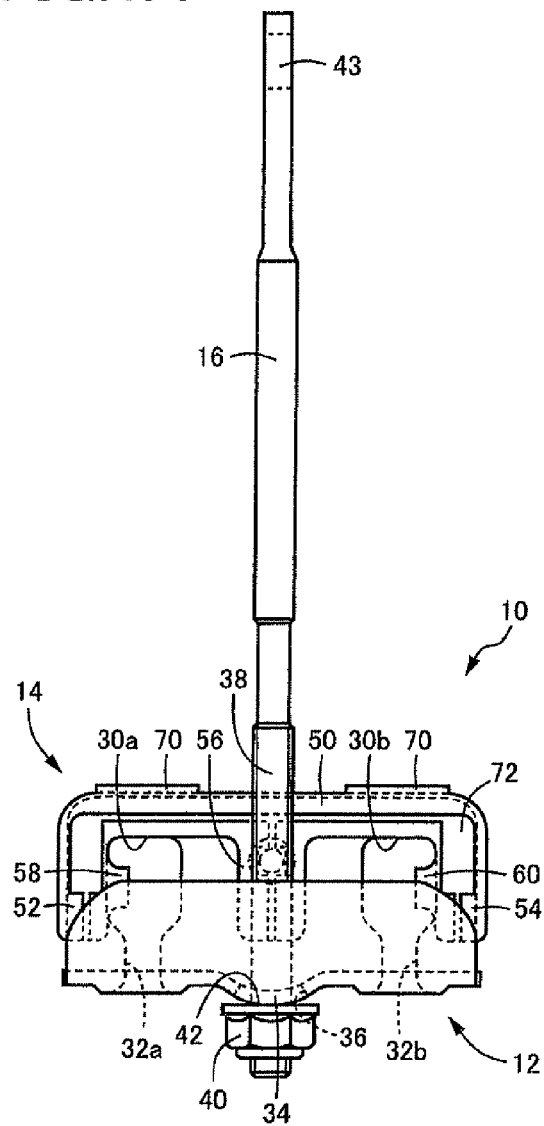
FIG. 1A to FIG. 1D are views showing a state where a pull rod is fitted to an equalizer device for a parking brake according to an embodiment of the invention.

Preferably, the above-described equalizer body is produced, for example, by subjecting a metal plate to press works such as a punching work, a boring work and a bending work. Preferably, the synthetic resin member is fitted, with a single-step work, to the equalizer body in the following manner such that the synthetic resin member is not allowed to be detached from the equalizer body. When the synthetic resin member is pressed substantially perpendicularly to the inner face of the first side plate of the equalizer body, the multiple engagement lugs are engaged with the outer edges of the first side plate and then proceed toward the outer face while being elastically deformed outward. Finally, the engagement lugs are engaged with the outer face. Note that there may be employed a configuration where the engagement lugs are engaged with the outer face by sliding the synthetic resin member parallel to the first side plate.

The output members that are engaged with the engagement portions (engagement holes) may be, for example, columnar or spherical metal cable ends that are fitted fixedly and concentrically with end portions of parking bake cables. However, the coupling members that are coupled to the brake devices are not limited to cables, and may be, for example, links. Preferably, a portion of each output member, which is seated at the engagement hole, is in an arc shape or a spherical shape so that the output member is oscillable.

Preferably, the input portion to which a pulling force is applied is in a projected arc shape (partially cylindrical shape) or a recessed arc shape (partially cylindrical shape), because the equalizer device is oscillated using the input portion as the axis of oscillation. Note that, when the input portion is in a projected arc shape, the input portion projects outward, whereas when the input portion is in a recessed arc shape, the input portion is recessed inward. However, various forms that allow oscillation of the equalizer device may be employed. For example, a columnar input member may be engaged in a circular hole such that relative oscillation of the input member about the axis is allowed. An input member, for example, a metal pull rod or a cable mechanically coupled to a parking brake operation device (a lever or a pedal) is coupled to the input portion. However, the above configuration may be employed in a case where a pulling force is electrically generated by an electric motor or the like.

The gate portions may take various forms as long as the gate portions return to their original form after the output members are seated in the engagement holes so that the output members are prevented from being detached from the equalizer device. The gate portions may be configured such that after the columnar output members are completely inserted into the equalizer body through the insertion holes, engagement of the gate portions with the output members is cancelled and the gate portions immediately return to their original form. Alternatively, the gate portions may be configured such that after the output members are moved toward the back plate, engagement of the gate portions with the output members is cancelled and the gate portions return to their original form.

The configuration for preventing, using the gate portions, the output members from being detached from the equalizer device is, for example, a configuration in which the gate portions partially or entirely block the engagement holes so that the output members are prevented from coming out of the equalizer body through the engagement holes. Alternatively, there may be employed a configuration in which when the output members move in such a direction that the output members recede (in such a direction that the output members come out of the equalizer body through the engagement holes), the output members contact the gate portions and thus further recession is prevented. As a result, the output members are prevented from coming out of the equalizer body through the engagement holes.

For example, one or more engagement lugs are formed such that the engagement lugs are engaged with the outer face of the first side plate at the side edges of the first side plate in the width direction. Alternatively, one or more engagement lugs may be formed such that the engagement lugs are engaged with the outer face of the first side plate at the distal edge of the first side plate. Further alternatively, the synthetic resin member may have engagement lugs at portions on both the side edge sides and the distal edge side.

According to the second invention, the length by which the second side plate of the equalizer body projects from the back plate is shorter than the length by which the first side plate of the equalizer body projects from the back plate. However, various forms may be employed when the other inventions are implemented. For example, the length by which the first side plate projects from the back plate may be equal to the length by which the second side plate projects from the back plate.

For example, a positioning projection that is fitted in a positioning hole formed in the first side plate and a rotation preventing projection that is engaged with the distal edge of the first side plate are formed integrally with the synthetic resin member. Alternatively, multiple sets of the positioning holes and positioning projections may be formed. Further alternatively, a rotation preventing projection that is engaged with the side edge of the first side plate may be formed. Note that these positioning projection and rotation preventing projection may be formed as needed.

Figure 1B:
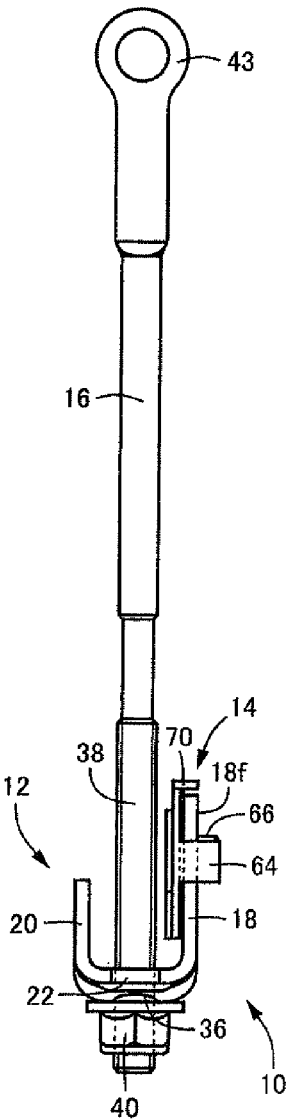
Figure 1C:
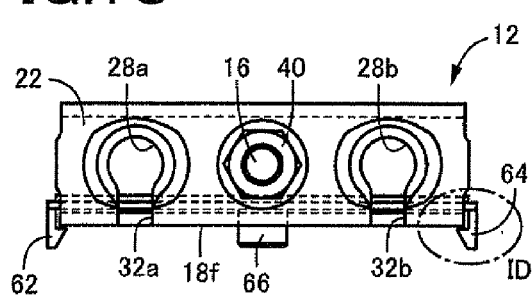
Figure 1D:
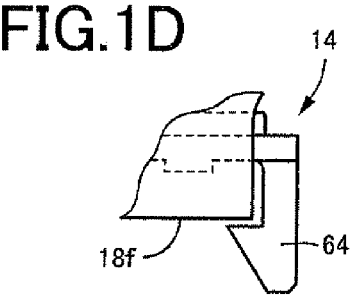
Figure 2:
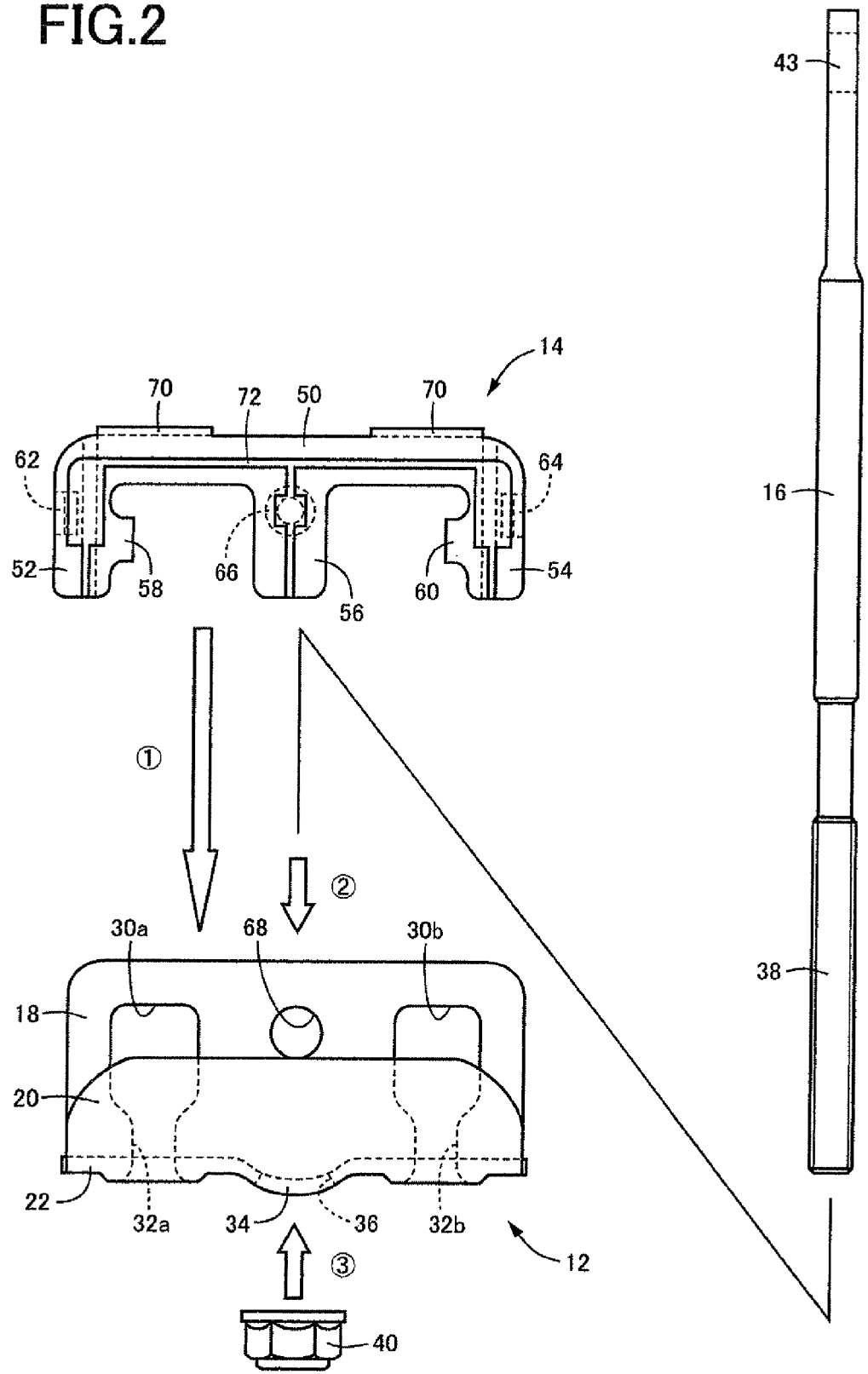
FIG. 2 and FIG. 3 each are an exploded view of the equalizer device in FIG. 1.
Figure 3:
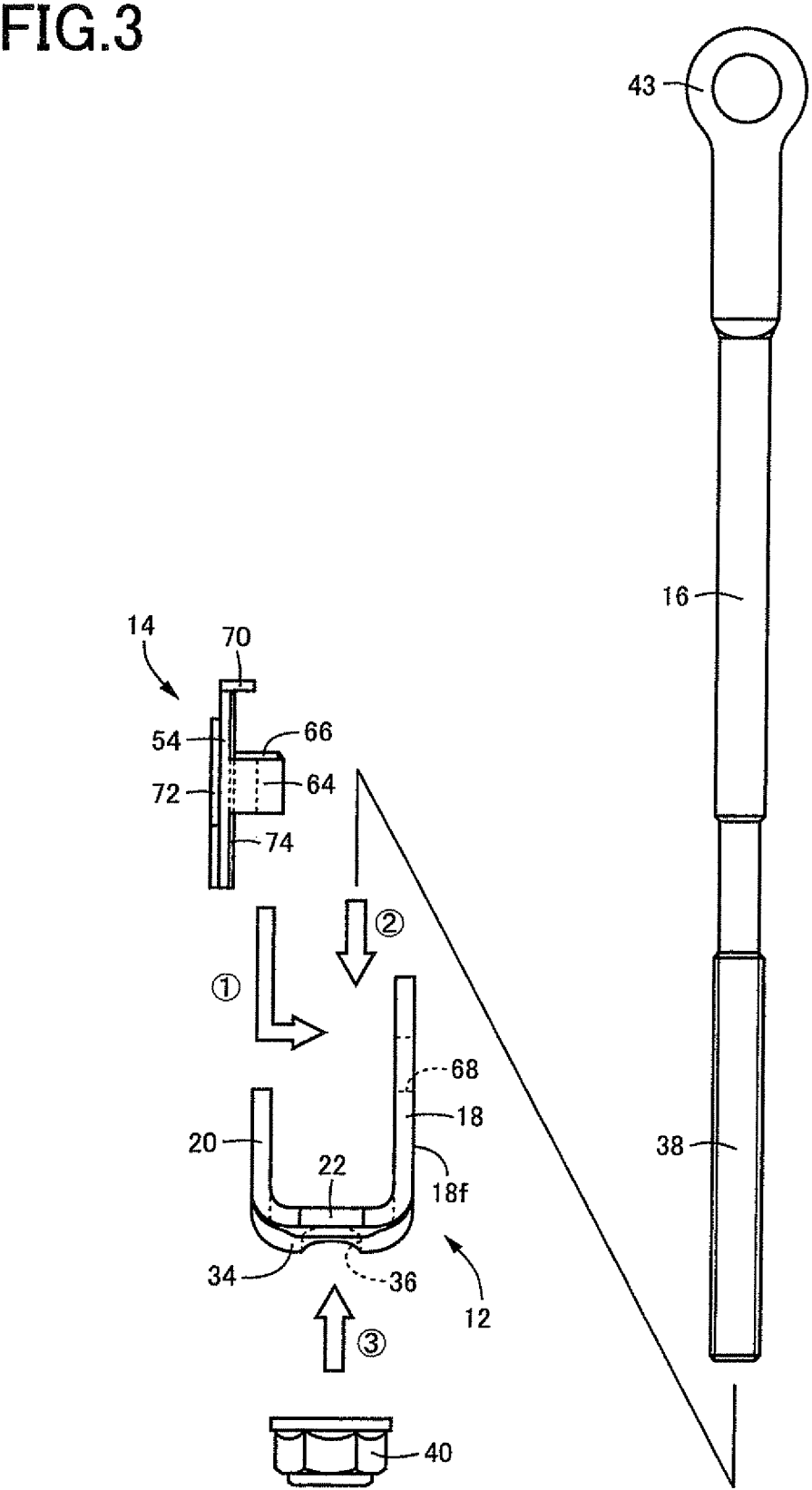
Figure 4A:
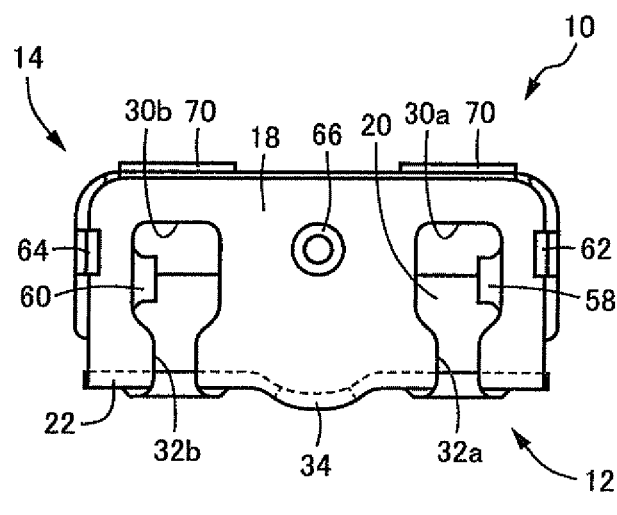
FIG. 4A and FIG. 4B are views showing a state where the pull rod is removed from the equalizer device in FIG. 1.
Figure 4B:
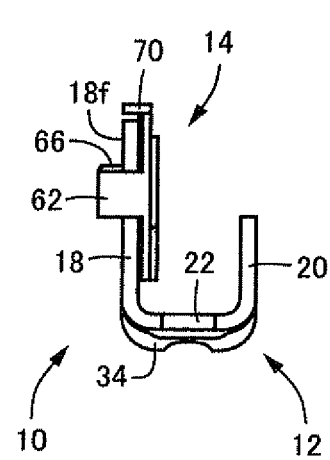
Figure 5:
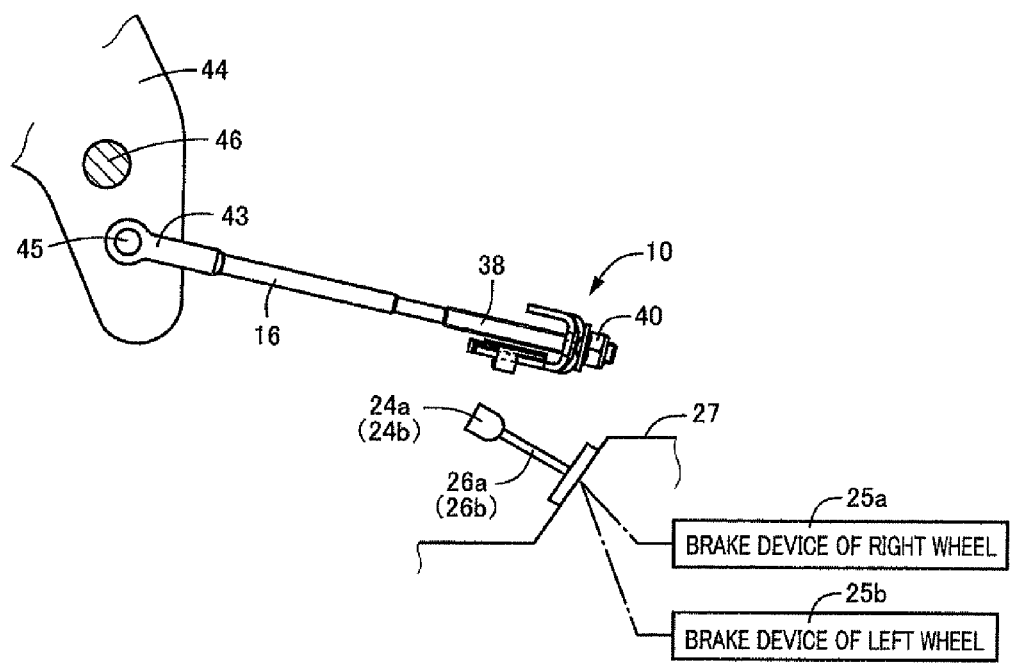
FIG. 5 is a view illustrating a work for coupling parking brake cables to the equalizer device in FIG. 1.

Hereafter, an embodiment of the invention will be described in detail with reference to the accompanying drawings. FIG. 1A to FIG. 1D are views showing a state where a pull rod 16 that serves as an input member is fitted to an equalizer device 10 according to an embodiment of the invention. FIG. 1A is a front view. FIG. 1B is a right side view of the equalizer device 10 and the pull rod 16 when they are viewed from a position on the right side of them in FIG. 1A. FIG. 1C is a bottom view of the equalizer device 10 and the pull rod 16 when they are viewed from a position under them in FIG. 1A. FIG. 1D is an enlarged view of a portion ID in FIG. 1C. FIG. 2 and FIG. 3 each are an exploded view of the equalizer device 10. FIG. 2 is a front view corresponding to FIG. 1A. FIG. 3 is a right side view corresponding to FIG. 1B. FIG. 4A and FIG. 4B are views showing a state where the pull rod 16 is removed from the equalizer device 10. FIG. 4A is a back view of the equalizer device 10 when it is viewed from a position behind it in FIG. 1A. FIG. 4B is a side view of the equalizer device 10 when it is viewed from a position on the right side of it in FIG. 4A. FIG. 5 is a view illustrating a work for coupling parking brake cables 26a, 26b to the equalizer device 10. FIG. 6A to FIG. 6C are views showing a state where the parking brake cables 26a, 26b are coupled to the equalizer device 10. FIG. 6A is a front view showing a state where an upper plate 20 of an equalizer body 12 is cut out. FIG. 6B is a right side view of the equalizer device 10 and the pull rod 16 when they are viewed from a position on the right side of them in FIG. 6A. FIG. 6C is a bottom view of the equalizer device 10 and the pull rod 16 when they are viewed from a position under them in FIG. 6A.

The equalizer device 10 includes the metal equalizer body 12 and a synthetic resin member 14 that is a single-piece member made of synthetic resin. The equalizer body 12 is a single-piece member that has a lower plate 18 and the upper plate 20, which are paired, side plates that extend parallel to each other, and a back plate 22 that connects the lower plate 18 and the upper plate 20 to each other so as to form a U-shape. The equalizer body 12 is produced, for example, by subjecting a metal plate to press works such as a bending work and a boring work. The lower plate 18 and the upper plate 20 correspond to a first side plate and a second side plate, respectively. In the embodiment, the length by which the lower plate 18 projects from the back plate 22 is longer than the length by which the upper plate 20 projects from the back plate 22. As shown in the right side views in FIG. 1B and FIG. 3, the equalizer body 12 has a J-shape. The length by which the upper plate 20 projects from the back plate 22 is approximately half the length by which the lower plate 18 projects from the back plate 22.

Cable ends 24a, 24b that are output members are inserted to the inner side of the U-shape of the equalizer body 12 and coupled to the equalizer body 12, as shown in FIG. 6A to FIG. 6C. The parking brake cables 26a, 26b coupled to brake devices 25a, 25b (see FIG. 5) of right and left wheels are connected to the cable ends 24a, 24b, respectively. The parking brake cables 26a, 26b correspond to coupling devices. As shown in FIG. 5, the parking brake cables 26a, 26b enter a vehicle interior through a floor 27 of a vehicle, and the columnar cable ends 24a, 24b concentrically fitted to end portions of the parking brake cables 26a, 26b are coupled to the equalizer device 10.

Paired engagement holes 28a, 28b are formed in the back plate 22 of the equalizer body 12 at two respective positions that are substantially symmetric in the longitudinal direction of the back plate 22 (the lateral direction in FIG. 6A). Through the engagement holes 28a and 28b, the parking brake cables 26a, 26b extend to the outside of the equalizer device 10. The cable ends 24a, 24b have a columnar shape, and the engagement holes 28a, 28b are smaller in diameter than the cable ends 24a, 24b. Therefore, the cable ends 24a, 24b are seated at the engagement holes 28a, 28b such that the cable ends 24a, 24b are unable to come out of the equalizer body 12 through the engagement holes 28a, 28b. End portions of the cable ends 24a, 24b, which are connected to the cables 26a, 26b, have a hemispherical shape, and are seated such that the cable end 24a, 24b are oscillable with respect to the engagement holes 28a, 28b, respectively. Portions of the back plate 22, at which the engagement holes 28a, 28b are formed, that is, portions at which the cable ends 24a, 24b are seated, correspond to engagement portions.

Paired insertion holes 30a, 30b are formed in the lower plate 18 of the equalizer body 12 at two positions that correspond to the paired engagement holes 28a, 28b, respectively.

More specifically, the insertion holes 30a, 30b are formed at two positions which are symmetric with respect to the center line of the equalizer body 12 and the distance (center-to-center distance) between which is equal to the distance between the engagement holes 28a, 28b. The insertion holes 30a, 30b extend parallel to each other. Due to the insertion holes 30a, 30b, the paired cable ends 24a, 24b are allowed to be inserted into the equalizer body 12. In addition, paired slits 32a, 32b are formed so as to lie astride the lower plate 18 and the back plate 22 and so as to extend parallel to the center line. The slits 32a, 32b connect the insertion holes 30a, 30b to the engagement holes 28a, 28b, respectively. The parking brake cables 26a, 26b are allowed to be inserted into the equalizer body 12 through these slits 32a, 32b, respectively. The upper plate 20 extends up to a middle position of the insertion holes 30a, 30b. Therefore, the upper plate 20 is made as short as possible for weight reduction while preventing the cable ends 24a, 24b from dropping toward the upper plate 20-side.

Further, an input portion 34 is formed in the back plate 22 of the equalizer body 12 at a middle portion between the paired engagement holes 28a, 28b. The input portion 34 bulges outward in an arc shape in the front view in FIG. 6A. A through-hole 36 is formed at the center of the input portion 34, and an external thread portion 38 of the pull rod 16 passes through the through-hole 36. A nut member 40 is screwed to the external thread portion 38. When a flat seating portion 42 of the nut member 40 is brought into contact with the input portion 34, a pulling force for actuating the brake devices 25a, 25b is applied from the pull rod 16. The through-hole 36 is a long hole that extends in the lateral direction in FIG. 6A. There is a backlash between the edge of the through-hole 36 and the pull rod 16. The equalizer device 10 is oscillable in the lateral direction in FIG. 6A using a contact portion, at which the nut member 40 contacts the input portion 34, as the axis of oscillation.

As shown in FIG. 5, a coupling portion 43 formed at an end portion of the pull rod 16, which is on the opposite side from the external thread portion 38, is relatively pivotably coupled to a coupling pin 45 of a parking brake operation lever 44. When the parking brake operation lever 44 is operated so as to be rotated clockwise about a support shaft 46, the pull rod 16 is moved leftward in FIG. 5. Thus, the equalizer device 10 is pulled leftward in FIG. 5 via the nut member 40 and the input portion 34 that are brought into contact with each other, and the brake devices 25a, 25b of the right and left wheels are actuated via the parking brake cables 26a, 26b, respectively. In this case, the equalizer device 10 is oscillated using the contact portion, at which the nut member 40 is in contact with the input portion 34, as the axis of oscillation such that the reaction forces that are applied to the equalizer device 10 from the parking brake cables 26a, 26b via the cable ends 24a, 24 are appropriately balanced. As a result, the brake devices 25a, 25b are actuated with brake forces that are substantially equal to each other.

The synthetic resin member 14 has shape of a thin and substantially flat plate. The synthetic resin member 14 is arranged so as to extend parallel to the lower plate 18 and so as to face the inner face of the lower plate 18, that is, the face of the lower plate 18, which faces the upper plate 20. As is clear from FIG. 1A and FIG. 2, the synthetic resin member 14 is a single-piece member that has a long plate portion 50 that is arranged along the distal edge of the lower plate 18, paired short plate portions 52, 54 that are formed at respective ends of the long plate portion 50 and that are arranged along the respective side edges of the lower plate 18, which are the edges in the width direction of the lower plate 18, and a center short plate portion 56 that is formed at the center portion of the long plate portion 50. The synthetic resin member 14 has an E-shape as a whole. The paired short plate portions 52, 54 are arranged on the outer sides of the insertion holes 30a, 30b, respectively. The short plate portions 52, 54 have gate portions 58, 60 that project into the insertion holes 30a, 30b to partially block the insertion holes 30a, 30b, respectively. When the cable ends 24a, 24b are being inserted into the equalizer body 12 through the insertion-holes 30a, 30b, the gate portions 58, 60 are elastically deformed. Thus, the gate portions 58, 60 allow insertion of the cable ends 24a, 24b into the equalizer body 12. The length by which the gate portions 58, 60 project is smaller than the radius of the columnar cable ends 24a, 24b. After the cable ends 24a, 24b are completely inserted into the equalizer body 12 through the insertion holes 30a, 30b, the gate portions 58, 60 return to their original form owing to their elasticity. Thus, the gate portions 58, 60 prevent the cable ends 24a, 24b from coming out of the equalizer body 12 through the insertion holes 30a, 30b to retain the cable ends 24a, 24b within the equalizer body 12.

The short plate portions 52, 54 have engagement lugs 62, 64 at portions that are on the side opposite from the gate portions 58, 60, that is, at portions that are on the outer side of the side edges of the lower plate 18. The engagement lugs 62, 64 extend on the outer side of the side edges of the lower plate 18 and extend beyond an outer face 18f that is the outer face of the equalizer body 12 (extend rightward in FIG. 1B, downward in FIG. 1C). The engagement lugs 62, 64 are engaged with the outer face 18f. Thus, the synthetic resin member 14 is fitted to the equalizer body 12 such that the synthetic resin member 14 is not allowed to be detached from the equalizer body 12. The engagement lugs 62, 64 are elastically deformable. As indicated by a reference numeral 1 with a circle in FIG. 3, when the synthetic resin member 14 is placed on the inner face of the lower plate 18 of the equalizer body 12 and then pressed against the lower plate 18, the engagement lugs 62, 64 are engaged with the side edges of the lower plate 18 and proceed toward the outer face 18f while being elastically deformed in outward direction. Then, the engagement lugs are automatically engaged with the outer face 18f. In this way, the synthetic resin member 14 is fitted to the equalizer body 12 with a single-step work. Reference numerals 1 to 3 with circles in FIG. 2 and FIG. 3 indicate the fitting steps respectively. After the synthetic resin member 14 is fitted to the equalizer body 12, the pull rod 16 is passed through the through-hole 36 and the nut member 40 is screwed to the pull rod 16. As a result, the state shown in FIG. 1 is achieved.

A cylindrical positioning projection 66 extends perpendicularly from the back face of the center short plate portion 56 of the synthetic resin member 14, that is, the face that faces the lower plate 18. When the positioning projection 66 is fitted in a positioning hole 68 formed in the lower plate 18, the synthetic resin member 14 is kept at a predetermined position of the lower plate 18. Paired rotation preventing projections 70 are formed at portions of the long plate portion 50, which are on the outer side of the distal edge of the lower plate 18, so as to extend toward the outer face 18f. The rotation preventing projections 70 are engaged with the distal edge of the lower plate 18. Thus, rattle of the synthetic resin member 14 is restricted. Predetermined reinforcement ribs 72, 74 are formed on the respective faces of the synthetic resin member 14.

In the above-described equalizer device 10 for the parking brake, the paired insertion holes 30a, 30b are formed in the lower plate 18 of the equalizer body 12 so as to extend parallel to each other. Therefore, when the paired parking brake cables 26a, 26b are coupled to the equalizer device 10, only the following works are required. The paired cable ends 24a, 24b are inserted into the equalizer body 12 through the insertion holes 30a, 30b by elastically deforming the gate portions 58, 60 of the synthetic resin member 14, and the parking brake cables 26a, 26b that extend from the cable ends 24a, 24b are inserted into the slits 32a, 32b. In this state, the cable ends 24a, 24b are relatively moved toward the back plate 22 to be seated at the engagement holes 28a, 28b, for example, by pulling the parking brake cables 26a, 26b. Therefore, it is possible to easily and promptly perform a work for coupling the parking brake cables 26a, 26b to the equalizer device 10.

More specifically, the equalizer device 10 to which the pull rod 16 is fitted in advance is coupled to the parking brake operation lever 44 via the pull rod 16 as shown in FIG. 5, and then the cable ends 24a, 24b that have entered the vehicle interior through the floor 27 of the vehicle are pushed into the insertion holes 30a, 30b to couple the cable ends 24a, 24b to the equalizer device 10. In this case, because the insertion holes 30a, 30b are formed in the lower plate 18 of the equalizer body 12 so as to extend parallel to each other, by pressing the equalizer device 10 with the cable ends 24a, 24b arranged substantially parallel to each other, the cable ends 24a, 24b are inserted into the equalizer 12 through the paired insertion holes 30a, 30b at the same time. As a result, the cable ends 24a, 24b are easily fitted to the equalizer device 10.

After the cable ends 24a, 24b are completely inserted into the equalizer body 12 through the insertion holes 30a, 30b, the gate portions 58, 60 of the synthetic resin member 14 return to their original forms to prevent the cable ends 24a, 24b from coming out of the equalizer body 12 through the insertion holes 30a, 30b. Therefore, the state of engagement of the cable ends 24a, 24b with the equalizer device 10 is appropriately maintained just by inserting the cable ends 24a, 24b into the equalizer body 12 through the insertion holes 30a, 30b by elastically deforming the gate portions 58, 60 to fit the cable ends 24a, 24b to the equalizer device 10.

The synthetic resin member 14 having the gate portions 58, 60 has a substantially flat plate shape, and is arranged to face the inner face of the lower plate 18. Further, paired engagement lugs 62, 64 extend on the outer side of the side edges of the lower plate 18 and extend beyond the outer face 18f, and are engaged with the outer face 18f. Thus, the synthetic resin member 14 is fitted to the equalizer body 12. Therefore, a flange or the like with which the synthetic resin member 14 is engaged is no longer required to be formed in the equalizer body 12, which reduces the production cost. Although the engagement lugs 62, 64 need to be formed in the synthetic resin member 14, the engagement lugs 62, 64 are easily formed integrally with the synthetic resin member 14. Therefore, it is possible to reduce the production cost as a whole.

In the embodiment, the paired engagement lugs 62, 64 are arranged so as to be engaged with the outer face 18f at respective side edges of the lower plate 18 in the width direction thereof. The engagement lugs 62, 64 are fixed such that the lower plate 18 is sandwiched therebetween in the longitudinal direction of the lower plate 18 (width direction). Accordingly, the dimensional deviation between these members is reliably absorbed. Therefore, it is possible to reliably fit the synthetic resin member 14 to the equalizer body 12.

The length by which the upper plate 20 of the equalizer body 12 projects from the back plate 22 is approximately half the length by which the lower plate 18 projects from the back plate 22, and therefore the equalizer body 12 has a J-shape. Because the length of the upper plate 20 is shorter, the weight of the equalizer body 12 is reduced accordingly. In addition, when the synthetic resin member 14 is fitted to the lower plate 18 of the equalizer body 12, the work is performed more efficiently because approximately half of the lower plate 18 extends beyond the upper plate 20. As a result, the work cost is reduced.

The positioning projection 66 and the rotation preventing projections 70 are formed integrally with the synthetic resin member 14. The positioning projection 66 is fitted in the positioning hole 68 formed in the lower plate 18, and the rotation preventing projections 70 are engaged with the distal edge of the lower plate 18. Therefore, with a simple configuration, it is possible to reliably suppress rattle of the synthetic resin member 14 with respect to the equalizer body 12.

In the embodiment described above, the length by which the upper plate 20 of the equalizer body 12 projects from the back plate 22 is shorter than the length by which the lower plate 18 projects from the back plate 22, and therefore the equalizer 12 has a J-shape that is asymmetric in a side view. However, as in an equalizer device 80 shown in FIG. 7, there may be employed an equalizer body 82 which has a U-shape that is symmetric in a side view, that is, in which the length by which the upper plate 20 projects from the back plate 22 is equal to or substantially equal to the length by which the lower plate 18 projects from the back plate 22.

The embodiment of the invention that has been described in detail with reference to the accompanying drawings is to be considered in all respects as illustrative and not restrictive. The invention may be implemented in other embodiments achieved by making various changes and modifications based on the knowledge of a person skilled in the art.

What is claimed is:

1. An equalizer device for a parking brake, in which paired engagement portions, with which paired output members coupled to brake devices of right and left wheels are respectively engaged, are formed so as to be symmetric with respect to an input portion, and which actuates the brake devices by pulling the paired output members in a state where the equalizer device is oscillable using the input portion as an axis of oscillation when a pulling force for actuating the parking brake is applied to the input portion, comprising:

an equalizer body that is formed by connecting paired side plates, which extend parallel to each other from a back plate so as to form a U-shape; and a synthetic resin member that is fixedly arranged inside the equalizer body, the equalizer body having paired engagement holes that are formed in the back plate, and that allow coupling members that couples the output members to the brake devices to extend outside the equalizer body and prevent the output members from passing through the engagement holes, paired insertion holes which are formed in a first side plate, which is one of the paired side plates, so as to correspond to the paired engagement holes, and through which the paired output members are inserted to an inner side of the U-shape, and paired slits which are formed so as to lie astride the first side plate and the back plate and so as to connect each of the insertion holes to each of the engagement holes respectively, and into which the coupling members are inserted, portions of the back plate, at which the engagement holes are formed, serving as the engagement portions, the synthetic resin member having a substantially flat plate shape that is arranged so as to face a portion of an inner face of the first side plate, the portion being a part of the U-shape, and so as to extend parallel to the first side plate, the synthetic resin member including paired gate portions that are formed so as to partially block the respective paired insertion holes, that are elastically deformed to allow insertion of the output members into the equalizer body, and that return to their original form to prevent the output members from coming out of the equalizer body through the insertion holes, and an engagement lug that extends on an outer side of an outer edge of the first side plate and extends beyond an outer face of the first side plate, which is on an opposite side from the inner face, and is engaged with the outer face, and the synthetic resin member being fitted to the equalizer body by the engagement lug.

2. The equalizer device for a parking brake according to claim 1, wherein:

a plurality of the engagement lugs is formed such that the engagement lugs are engaged with the outer face at both side edges of the first side plate in a width direction that is parallel to the back plate; and a second side plate, which is the other of the paired side plates of the equalizer body and which is on an opposite side from the first side plate, is formed such that a length by which the second side plate projects from the back plate is shorter than a length by which the first side plate projects from the back plate, so that the equalizer body has a J-shape.

3. The equalizer device for a parking brake according to claim 1, wherein a positioning projection and a rotation preventing projection are formed integrally with the synthetic resin member, the positioning projection is fitted in a positioning hole formed in the first side plate, and the rotation preventing projection is engaged with a distal edge of the first side plate, which is an edge that faces a direction in which the first side plate projects from the back plate.

4. The equalizer device for a parking brake according to claim 2, wherein a positioning projection and a rotation preventing projection are formed integrally with the synthetic resin member, the positioning projection is fitted in a positioning hole formed in the first side plate, and the rotation preventing projection is engaged with a distal edge of the first side plate, which is an edge that faces a direction in which the first side plate projects from the back plate.

* * * * *